(12) United States Patent
Sawai

(10) Patent No.: US 9,332,131 B2
(45) Date of Patent: May 3, 2016

(54) INFORMATION PROCESSING DEVICE, USAGE CHARGE CALCULATION METHOD AND PROGRAM

(71) Applicant: Sony Corporation, Tokyo (JP)

(72) Inventor: Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/381,041

(22) PCT Filed: Jan. 21, 2013

(86) PCT No.: PCT/JP2013/051059
§ 371 (c)(1),
(2) Date: Aug. 26, 2014

(87) PCT Pub. No.: WO2013/132901
PCT Pub. Date: Sep. 12, 2013

(65) Prior Publication Data
US 2015/0011183 A1    Jan. 8, 2015

(30) Foreign Application Priority Data

Mar. 5, 2012    (JP) ................. 2012-047866

(51) Int. Cl.
*H04M 15/00* (2006.01)
*H04L 12/14* (2006.01)
(Continued)

(52) U.S. Cl.
CPC ........... *H04M 15/58* (2013.01); *H04L 12/1446* (2013.01); *H04M 15/60* (2013.01); *H04M 15/8016* (2013.01); *H04M 15/8027* (2013.01); *H04M 15/8044* (2013.01); *H04M 15/8055* (2013.01); *H04M 15/8214* (2013.01); *H04M 15/83* (2013.01); *H04M 15/835* (2013.01); *H04M 15/8351* (2013.01);
(Continued)

(58) Field of Classification Search
CPC ........ H04M 15/58; H04M 15/60; H04W 4/26
USPC ................................ 455/405, 406, 407, 408
See application file for complete search history.

(56) References Cited

U.S. PATENT DOCUMENTS 7,937,082 B2    5/2011    Ohno et al.
8,489,091 B2    7/2013    Ohno et al.
(Continued)

FOREIGN PATENT DOCUMENTS

CN    1450749 A    10/2003
CN    101433073 A    5/2009
(Continued)

OTHER PUBLICATIONS

International Search Report from International Publication PCT/JP2013/051059 mailed Mar. 19, 2013.
(Continued)

*Primary Examiner* — Leon Flores
(74) *Attorney, Agent, or Firm* — Hazuki International, LLC

(57) ABSTRACT

Provided is an information processing device including a calculation unit which calculates a usage charge to be imposed by a first provider on a second provider which provides a radio communications service using a physical network possessed by the first provider. The calculation unit calculates the usage charge based on a value of a parameter depending on efficiency of use of radio resources in the radio communications service.

9 Claims, 14 Drawing Sheets

(51) Int. Cl.
*H04W 4/24* (2009.01)
*H04W 4/26* (2009.01)
*H04W 48/18* (2009.01)

(52) U.S. Cl.
CPC .......... *H04M 15/85* (2013.01); *H04M 15/851* (2013.01); *H04M 15/852* (2013.01); *H04M 15/854* (2013.01); *H04W 4/24* (2013.01); *H04W 4/26* (2013.01); *H04W 48/18* (2013.01)

(56) References Cited

U.S. PATENT DOCUMENTS

| | | |
|---|---|---|
| 8,737,382 B2 | 5/2014 | Moon et al. |
| 8,805,287 B2 | 8/2014 | Sawai |
| 2006/0036520 A1 | 2/2006 | O'Neill |
| 2009/0181641 A1* | 7/2009 | Fiatal ........................... 455/406 |
| 2010/0017861 A1* | 1/2010 | Krishnaswamy et al. ........ 726/7 |
| 2011/0286344 A1 | 11/2011 | Hanaoka et al. |
| 2012/0088469 A1 | 4/2012 | Cai et al. |
| 2012/0315936 A1 | 12/2012 | Sawai et al. |

FOREIGN PATENT DOCUMENTS

| | | |
|---|---|---|
| JP | 04-242366 A | 8/1992 |
| JP | 2002-315057 A | 10/2002 |
| JP | 2003-348227 A | 12/2003 |
| JP | 2006-295684 A | 10/2006 |
| JP | 2007-526690 A | 9/2007 |
| JP | 2008-510371 A | 4/2008 |
| JP | 2011-211368 A | 10/2011 |
| JP | 2011-211369 A | 10/2011 |
| JP | 2011-244369 A | 12/2011 |
| WO | 2005079030 A1 | 8/2005 |
| WO | 2011-002450 A1 | 1/2011 |

OTHER PUBLICATIONS

Chinese Office Action issued on Jun. 25, 2015 in patent application No. 201380011965.4.

* cited by examiner

MP : Measurement Point
CME : Charging Management Entity
RRM : Radio Resource Manager

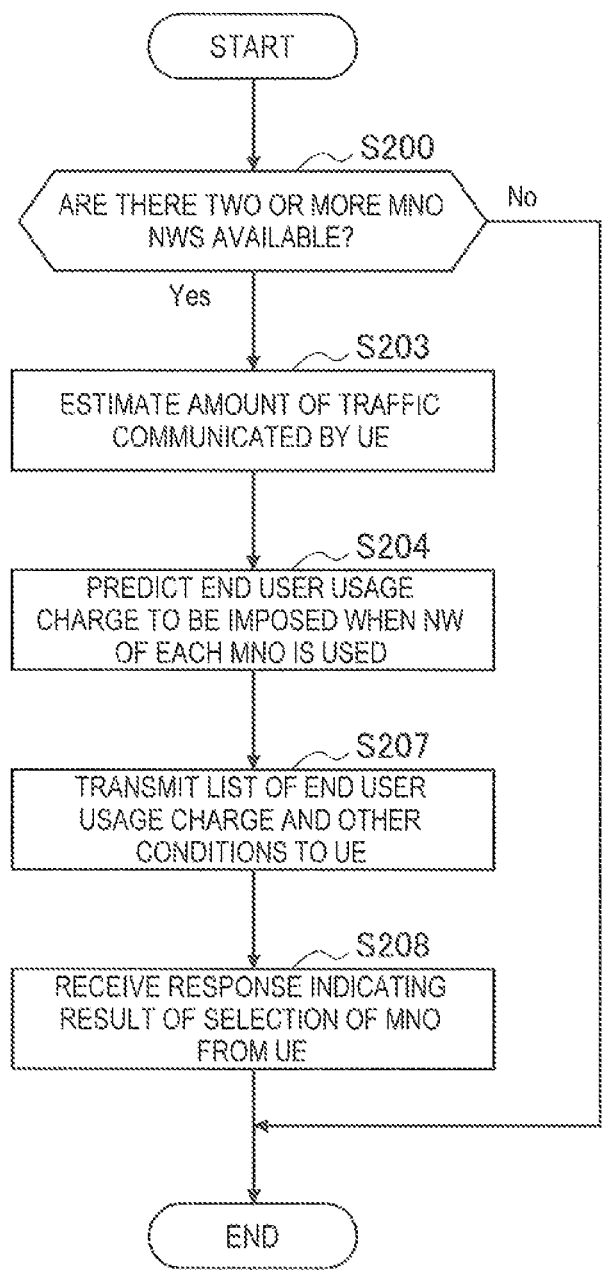

INFORMATION PROCESSING DEVICE, USAGE CHARGE CALCULATION METHOD AND PROGRAM

CROSS-REFERENCE TO RELATED APPLICATION

The present application is a national phase entry under 35 U.S.C. §371 of International Application No. PCT/JP2013/051059 filed Jan. 21, 2013, published on Sep. 12, 2013 as WO 2013/132901 A1, which claims priority from Japanese Patent Application No. JP 2012-047866, filed in the Japanese Patent Office on Mar. 5, 2012.

TECHNICAL FIELD

The present disclosure relates information processing devices, usage charge calculation methods and programs.

BACKGROUND ART

In recent years, it has become practical to use a high-speed cellular radio communication technique, such as LTE (Long Term Evolution), WiMAX, etc., and therefore, the communication rate of radio communications services enjoyable for mobile users has been significantly improved. Moreover, it is expected that the introduction of the fourth-generation cellular radio communication technique, such as LTE-A (LTE-Advanced) etc., would further improve the communication rate.

On the other hand, there has been a rapidly increasing number of mobile users, and therefore, there has been increasing use of applications requiring a high data rate. As a result, the cellular radio communication technique has not yet been developed to meet all needs of mobile users. A solution to meet various needs of mobile users is to utilize an MVNO (Mobile Virtual Network Operator). An MVNO refers to a provider which borrows a physical network infrastructure from an MNO (Mobile Network Operator) to provide radio communications services. In such a service scheme, MVNOs do not need to pay the high cost of construction of a physical network. An MNO lends a physical network to an MVNO and allows the MVNO to use a portion of the radio resources, thereby receiving a usage charge while effectively utilizing the facility. As the number of available MVNOs increases, a wider choice of services can be provided, which is of great benefit to end users.

A problem which occurs when MVNOs are utilized is congestion on radio resources. If a large number of providers provide radio communications services on limited radio resources without control, radio signals are likely to interfere with each other, leading to a deterioration in general communication performance or quality. Therefore, providers which provide radio communications services are required to use radio resources with as much efficiency and cooperation as possible.

A variety of techniques are known for efficiently using limited radio resources while avoiding interference. For example, Patent Literature 1 below proposes a technique of controlling transmission power between radio communications services in a cooperative manner. Patent Literature 2 below proposes a technique of controlling transmission beams between radio communications services in a cooperative manner.

CITATION LIST

Patent Literature

Patent Literature 1: JP 2011-211369A
Patent Literature 2: JP 2011-211368A

SUMMARY OF INVENTION

Technical Problem

However, in the architecture of existing MVNOs, a charge to be imposed by an MNO on an MVNO is determined based on the amount of traffic measured using a gateway device located between the core network of the MNO and the network of the MVNO. In this case, the amount of radio resources consumed to transmit the same amount of data traffic is not taken into account when determining the amount of money to be charged. Therefore, MVNOs are not sufficiently motivated to efficiently use radio resources.

With these circumstances in mind, it is desirable to provide an arrangement for motivating MVNOs to efficiently use radio resources so that efficient use of radio resources can be promoted when MVNOs are utilized.

Solution to Problem

According to the present disclosure, there is provided an information processing device including a calculation unit which calculates a usage charge to be imposed by a first provider on a second provider which provides a radio communications service using a physical network possessed by the first provider. The calculation unit calculates the usage charge based on a value of a parameter depending on efficiency of use of radio resources in the radio communications service.

According to another aspect of the present disclosure, there is provided a method for calculating a usage charge to be imposed by a first provider on a second provider which provides a radio communications service using a physical network possessed by the first provider, the method including calculating, by a processor of an information processing device, the usage charge based on a value of a parameter depending on efficiency of use of radio resources in the radio communications service.

According to another aspect of the present disclosure, there is provided a program for causing a computer which controls an information processing device to function as a calculation unit which calculates a usage charge to be imposed by a first provider on a second provider which provides a radio communications service using a physical network possessed by the first provider, based on a value of a parameter depending on efficiency of use of radio resources in the radio communications service.

Advantageous Effects of Invention

According to the technology of the present disclosure, efficient use of radio resources can be promoted when MVNOs are utilized.

BRIEF DESCRIPTION OF DRAWINGS

FIG. 14 is a flowchart showing a third example flow of an MNO selection process.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Figure 1:
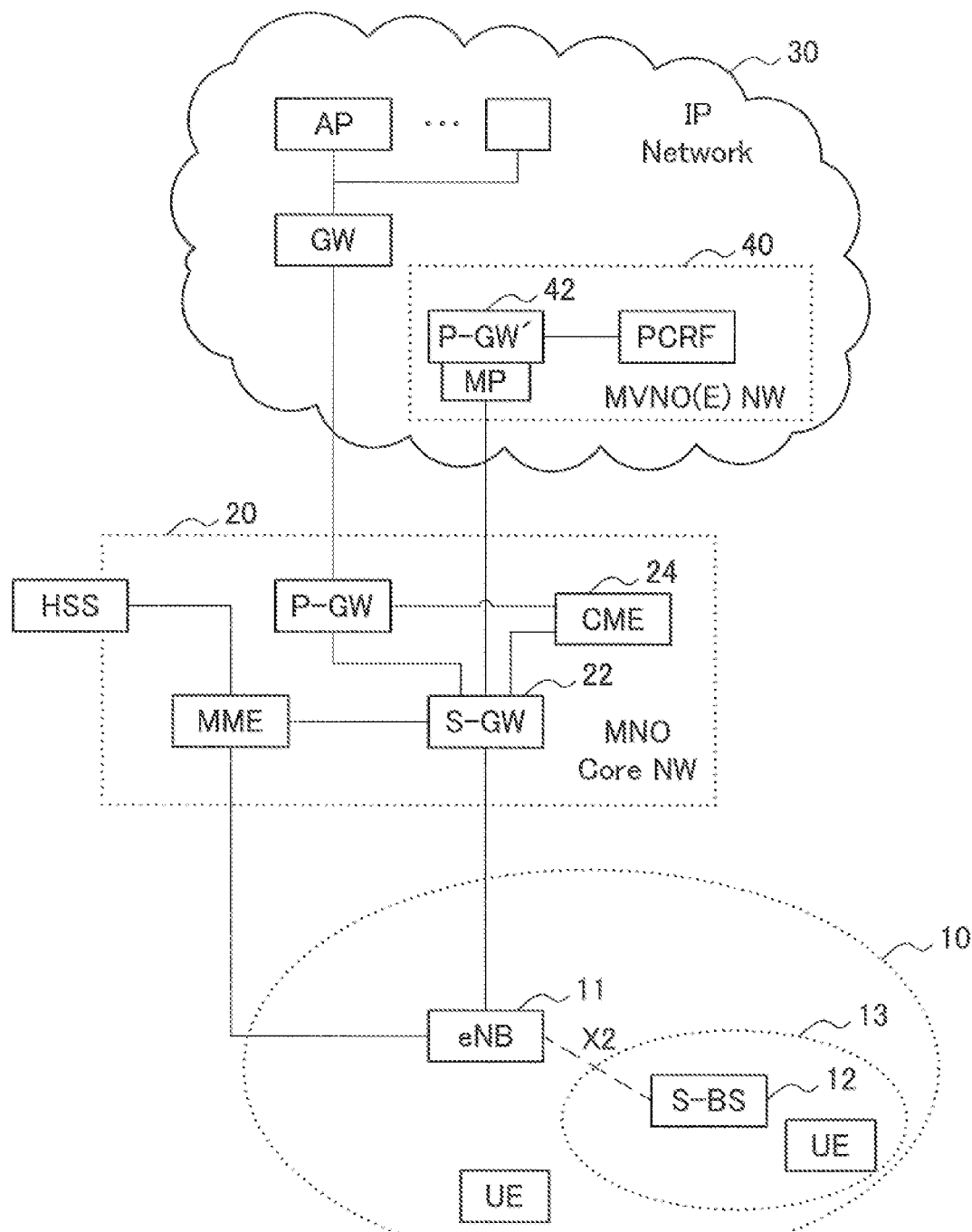
FIG. 1 is a diagram for describing an example of an existing architecture for imposing a charge on an MVNO.

The description will be given in the following order.
1. Overview of System
1-1. Example of Existing Architecture
1-2. Description of Problems
1-3. Example of Novel Architecture
2. Configuration of Charge Management Entity (CME)
2-1. Example Configuration of Device
2-2. First Example of Usage Charge Calculation Method
2-3. Second Example of Usage Charge Calculation Method
2-4. Third Example of Usage Charge Calculation Method
3. Example Applications
3-1. Example Configuration of Radio Resource Manager (RRM)
3-2. MNO Selection Process
4. Summary <1. Overview of System>
[1-1. Example of Existing Architecture]
FIG. 1 is a diagram for describing an example of an existing architecture for imposing a charge on an MVNO. FIG. 1 shows an LTE-based network architecture. In the LTE-based network architecture, a base station (eNB) 11 provides a radio communications service to a user terminal (UE) located in a macro cell 10. The base station 11 is provided by an MNO. The base station 11 is connected to a core network 20. The core network 20 is a physical network possessed by the MNO. In the example of FIG. 1, the core network 20 is implemented as an EPC (Evolved Packet Core) including, for example, a P-GW, an S-GW, and an MME. The core network 20 is also connected to an external network 30. The external network 30 is an IP (Internet Protocol) network which is also called a PDN (Packet Data Network). On the external network 30, various application (AP) servers may be implemented. The external network 30 may include an MVNO network 40. The MVNO network 40 is an IP network possessed by the MVNO. A gateway device 42 of the MVNO network 40 is connected to a gateway device 22 of the core network 20.

In the macro cell 10, a small cell base station (S-BS) 12 may also be provided. The small cell base station 12 provides a supplemental radio communications service to a user terminal located in a small cell 13. The concept of a small cell encompasses a femtocell, a nanocell, a picocell, a microcell, etc. A small cell base station may be provided by either an MNO or an MVNO. A small cell base station which has an X2 interface between itself and a macro cell base station is categorized into Type 2. A small cell base station which does not have an X2 interface between itself and a macro cell base station is categorized into Type 1.

Nodes shown in FIG. 1 have the following respective functions. Although only representative nodes are here shown, other nodes may be included in the network architecture.

HSS (Home Subscriber Server): a server which manages identification information, profile information, authentication information, etc. of subscribers.

MME (Mobility Management Entity): an entity which communicates a NAS (Non Access Stratum) signal to and from an UE to perform mobility management, session management, paging, etc. The entity is connected to a plurality of eNBs.

P-GW (PDN-Gateway): a gateway which is located at a connection point between an EPC and a PDN, and performs assignment of an IP address to an UE, addition and deletion of an IP header, etc.

S-GW (Serving-Gateway): a gateway which is located at a connection point between an E-UTRAN and an EPC, and routes packets in the user plane. When an UE is handed over between eNBs or between UTRANs, an S-GW acts as an anchor point.

eNB (evolved Node B): a base station which provides a radio link in a macro cell, and performs radio bearer control, scheduling, etc.

PCRF (Policy and Charging Enforcement Function): an entity which controls a QoS policy for data traffic of a user who uses an MVNO, and manages a charge to be imposed on each user.

Figure 2:
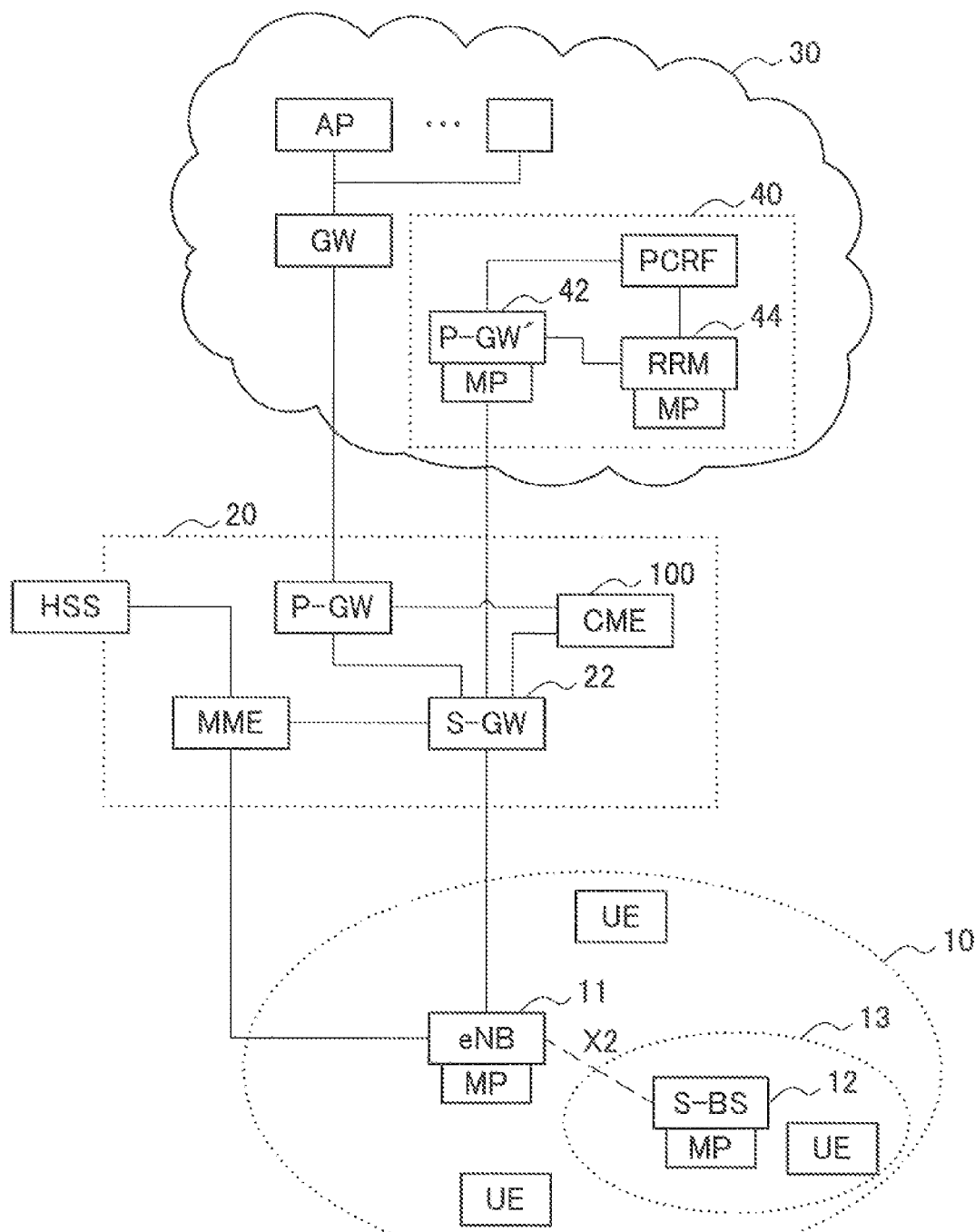
FIG. 2 is a diagram for describing an example of a novel architecture for imposing a charge on an MVNO.

In such a network architecture, an MVNO may borrow a physical network infrastructure (e.g., the core network 20 and the base station 11) of an MNO, and provide its own radio communications service to users. In consideration of this, the MNO receives a usage charge from the MVNO. The usage charge to be imposed by the MNO on the MVNO is typically determined based on the amount of data traffic communicated to and from users who are subscribers of the MVNO. The amount of traffic based on which the usage charge is determined is, for example, measured by the gateway device 42 of the MVNO network 40 connected to the gateway device 22 of the core network 20. FIG. 2 shows that a measurement point (MP) is located at the gateway device 42. The usage charge is, for example, calculated by a charging management entity (CME) 24 provided in the core network 20. The charging management entity 24 regularly receives the result of the measurement of the amount of traffic from the gateway device 42, and based on the received measurement result, calculates the usage charge to be imposed on the MVNO.

[1-2. Description of Problems]

In such an architecture, however, the amount of radio resources consumed to transmit the same amount of data traffic is not taken into account when determining the amount of money to be charged. For example, it is assumed that $N_{RB}$ resource blocks are consumed to transmit 10 Mbytes of data to a user Ua. Similarly, if a user Ub desires to transmit 10 Mbytes of data, another $N_{RB}$ resource blocks (i.e., a total of $2N_{RB}$ resource blocks) will be consumed. However, if transmission beams are controlled in a cooperative manner, a total of $N_{RB}$ resource blocks may only be consumed to transmit 10 Mbytes of data to the user Ua and 10 Mbytes of data to the user Ub. However, if a total of 20 Mbytes of data is transmitted, the usage charge to be imposed by the MNO on the MVNO remains unchanged.

Also, the amount of traffic flowing to the MVNO network 40 is not dependent on the amount of radio resources consumed for control signaling, such as handover control, retransmission control, etc. Therefore, even if a control scheme having a smaller overhead of control signaling is available, it is not very beneficial to the MVNO to positively employ such a control scheme.

Thus, in the existing architecture, an MVNO is not sufficiently motivated to efficiently use radio resources. However, radio resources are actually limited. If a large number of providers provide radio communications services without efficiently using limited radio resources, general communication performance or quality may deteriorate, leading to disadvantages to an MNO and end users. Therefore, in the following sections, an arrangement for motivating an MVNO to efficiently use radio resources in order to prevent or reduce congestion on radio resources while positively utilizing an MVNO, will be described.

[1-3. Example of Novel Architecture]

FIG. 2 is a diagram for describing an example of a novel architecture for imposing a charge on an MVNO will be described.

Referring to FIG. 2, a radio resource manager (RRM) 44 is introduced in the MVNO network 40. The radio resource manager 44 controls a base station (at least one of the macro cell base station 11 and the small cell base station 12) used by an MVNO and a user terminal of a user which is a subscriber of the MVNO so that radio resources are efficiently used. The radio resource manager 44 may control the base station and the user terminal, for example, in accordance with the technique described in Patent Literature 1 or 2 above.

Moreover, additional measurement points (MP) are provided on some nodes. Note that not all of these measurement points need to be implemented. A measurement point is provided on the macro cell base station 11. Another measurement point may be provided on the small cell base station 12. The amount of radio resources consumed in a radio communications service provided by an MVNO may be measured at these measurement points. A measurement point is provided on the radio resource manager 44. A resource efficiency achieved in a radio communications service provided by an MVNO may be measured at the measurement point on the radio resource manager 44. Also, a reference resource efficiency achieved by an MNO may be measured at the measurement point on the macro cell base station 11. The degree of traffic congestion may be measured at the measurement point on the macro cell base station 11.

A charging management entity (CME) 100 calculates a usage charge to be imposed on an MVNO based on the value of a resource-related parameter, i.e., a parameter which is dependent on the efficiency of use of radio resources, which is measured at least one of the above measurement points. The usage charge (the amount of money) may typically decrease with a decrease in the amount of radio resources consumed to transmit the same amount of data traffic. An MVNO may post the reduction in usage charge achieved by the efficient use of radio resources as its own profit, or may determine an end user usage charge to be imposed on an end user, taking into account the reduction in usage charge. An example configuration of the charging management entity 100 will be described in detail below.

Although an LTE-based network architecture is shown as an example in FIGS. 1 and 2, the technology of the present disclosure is not limited to such an example. For example, the technology of the present disclosure is applicable to a network architecture based on any cellular radio communication scheme, such as W-CDMA, CDMA2000, WiMAX, LTE-A, etc. Also, herein, functional elements described as being provided by an MVNO may be provided by an MVNE (Mobile Virtual Network Enabler) instead of an MVNO. Also, a radio resource manager (RRM) may be provided in the core network 20 or on a base station instead of being provided in the MVNO network 40 as in the example of FIG. 2. Alternatively, a radio resource manager (RRM) may be implemented as a physically independent control node or as a functional entity on an existing control node.

<2. Configuration of Charge Management Entity (CME)>

[2-1. Example Configuration of Device]

Figure 3:
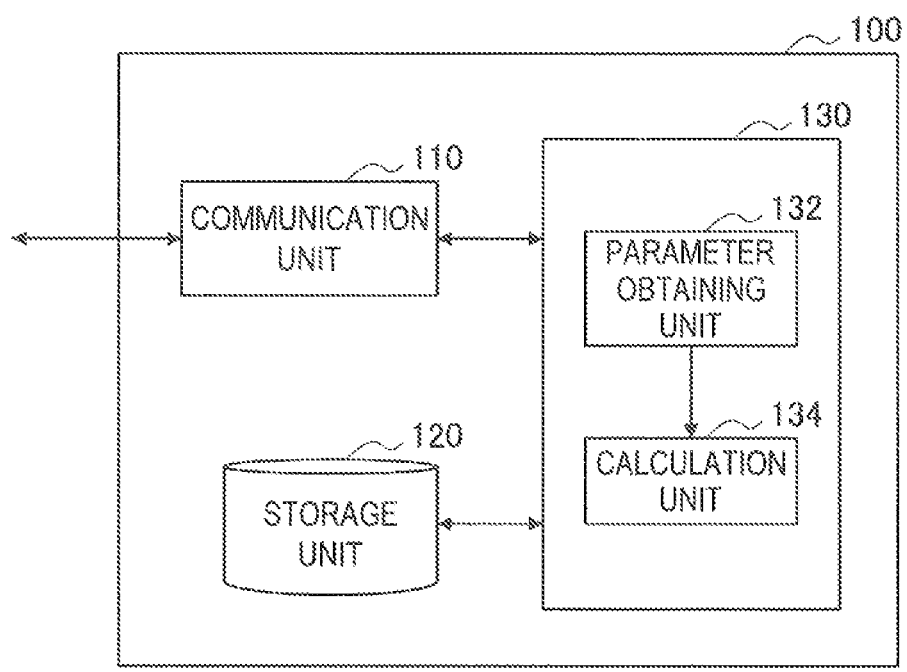
FIG. 3 is a block diagram showing an example configuration of a charging management entity (CME) according to an embodiment.

FIG. 3 is a block diagram showing an example configuration of the charging management entity 100 according to an embodiment. Referring to FIG. 3, the charging management entity 100 includes a communication unit 110, a storage unit 120, and a control unit 130.

(1) Communication Unit

The communication unit 110 is a communication module for allowing the charging management entity 100 to communicate with another node. The communication unit 110 may include a radio communication module including an antenna and an RF (Radio Frequency) circuit, or a wired communication module, such as a LAN (Local Area Network)-connected terminal etc.

(2) Storage Unit

The storage unit 120 stores a program and data for operating the charging management entity 100, using a storage medium, such as a hard disk, a semiconductor memory, etc. For example, the storage unit 120 stores values of a resource-related parameter received from various measurement points. The storage unit 120 also stores a usage charge for each MVNO which is calculated based on the resource-related parameter.

(3) Control Unit

The control unit 130 corresponds to a processor, such as a CPU (Central Processing Unit), a DSP (Digital Signal Processor), etc. The control unit 130 executes a program stored in the storage unit 120 or another storage medium to cause the charging management entity 100 to perform various functions. In this embodiment, the control unit 130 includes two functional modules, i.e., a parameter obtaining unit 132 and a calculation unit 134.

(3-1) Parameter Obtaining Unit

The parameter obtaining unit 132 obtains the value of a resource-related parameter which varies depending on the efficiency of use of radio resources in a radio communications service provided by an MVNO, from various measurement points illustrated in FIG. 2.

The resource-related parameter may include, for example, the amount of radio resources consumed. The amount (consumption) of radio resources consumed may typically be measured by a base station or another control node which performs scheduling of radio resources, and may be reported to the charging management entity 100.

Instead of or in addition to this, the resource-related parameter may include, for example, a resource efficiency achieved in a radio communications service provided by an MVNO. The resource efficiency may, for example, be defined as an average throughput on a predetermined amount of radio resources. The average throughput may, for example, be measured for radio resources which may be used by both of an MVNO and an MNO in a certain area (the macro cell 10 of FIG. 2 etc.). Instead of the average throughput, the total throughput over a predetermined period of time may be measured. The resource efficiency achieved by an MVNO may be evaluated by comparing it with the reference resource efficiency achieved by an MNO. For example, the radio resource manager 44 may measure the resource efficiency achieved by an MVNO, and report the measurement result to the charging management entity 100. On the other hand, the reference resource efficiency may be measured by the macro cell base station 11, and reported to the charging management entity 100.

Moreover, the resource-related parameter may include the degree of traffic congestion. The degree of traffic congestion may, for example, be defined as the amount of traffic per unit time measured on a network (a core network or a radio access network) of an MNO. The degree of traffic congestion may, for example, be measured by the macro cell base station 11, and reported to the charging management entity 100.

Also, the parameter obtaining unit 132 may obtain the amount of traffic measured by the gateway device 42 of the MVNO network 40 as with an existing charging management entity.

(3-2) Calculation Unit

The calculation unit 134 calculates a usage charge to be imposed by an MNO on an MVNO based on the value of the resource-related parameter obtained by the parameter obtaining unit 132. The calculation unit 134 may calculate the usage charge based on any combination of some or all of various resource-related parameters described above. The usage charge may typically be calculated to be a smaller amount of money as the efficiency of use of radio resources determined based on the resource-related parameter. For example, the calculation unit 134 may directly calculate the usage charge from the value of the resource-related parameter (e.g., using a calculation expression, a correspondence table, etc. on which an MNO and an MVNO previously agree). Instead, the calculation unit 134 may calculate the rate of discount based on the value of the resource-related parameter. In the latter case, the calculation unit 134 may calculate a basic usage charge based on the result of the measurement of the amount of traffic obtained from the gateway device 42 as in the existing arrangement, and multiply the basic usage charge by the above rate of discount, to determine a usage charge to be imposed on an MVNO. The calculation unit 134 may also adjust the usage charge based on the degree of traffic congestion. In the following section, three representative examples of the usage charge calculation method will be described.

The calculation unit 134 regularly calculates a usage charge for each MVNO based on the value of the resource-related parameter, and informs the MVNO network 40 of the calculated usage charge. The PCRF in the MVNO network 40 performs a payment process based on the usage charge of which the MVNO network 40 has been informed. The PCRF also performs charging of an end user. The end user usage charge to be imposed on each end user is basically determined based on the amount of data traffic for the end user. The end user usage charge may be discounted based on a reduction in the usage charge imposed on an MVNO.

[2-2. First Example of Usage Charge Calculation Method]

In a first example of the usage charge calculation method, the calculation unit 134 calculates the basic usage charge based on the amount of radio resources consumed. The calculation unit 134 may also adjust the usage charge based on the degree of traffic congestion.

(1) General Process Sequence

Figure 4:
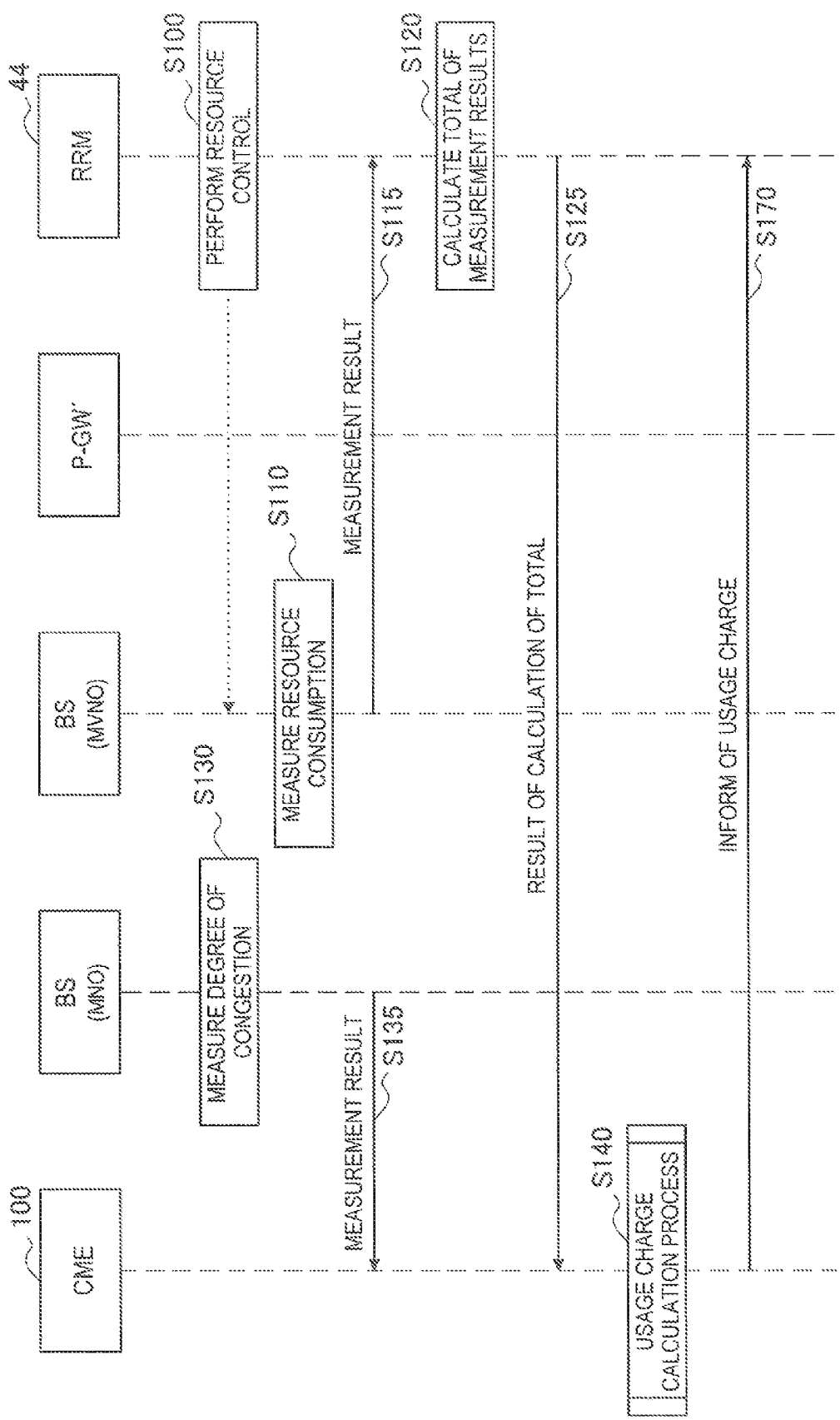
FIG. 4 is a sequence diagram showing an example general flow of a charging control process for a first example of a usage charge calculation method.

FIG. 4 is a sequence diagram showing an example general flow of a charging control process for the first example of the usage charge calculation method.

Referring to FIG. 4, initially, the radio resource manager 44 performs a resource control on a radio communications service provided by an MVNO (step S100). Here, the resource control may be any control that allows for efficient use of radio resources. For example, transmission power may be controlled in a cooperative manner or transmission beams may be controlled in a cooperative manner.

Next, a base station which operates for the MVNO measures the amount of radio resources consumed in the radio communications service of the MVNO (step S110). Here, the measured amount of radio resources consumed is reported to the radio resource manager 44 (step S115). The radio resource manager 44 calculates the total of the amounts of radio resources consumed reported from one or more base stations when necessary (step S120), and reports the result of the calculation of the total to the charging management entity 100 (step S125).

On the other hand, a base station which operates for the MNO measures the degree of traffic congestion (step S130). Here, the measured degree of traffic congestion is reported to the charging management entity 100 (step S135).

Next, the calculation unit 134 of the charging management entity 100 performs a usage charge calculation process based on the reported values of the resource-related parameters, i.e., the amount of radio resources consumed and the degree of traffic congestion (step S140). Thereafter, the calculation unit 134 informs the MVNO network 40 of the calculated usage charge (step S170).

(2) Usage Charge Calculation Process

Figure 5:
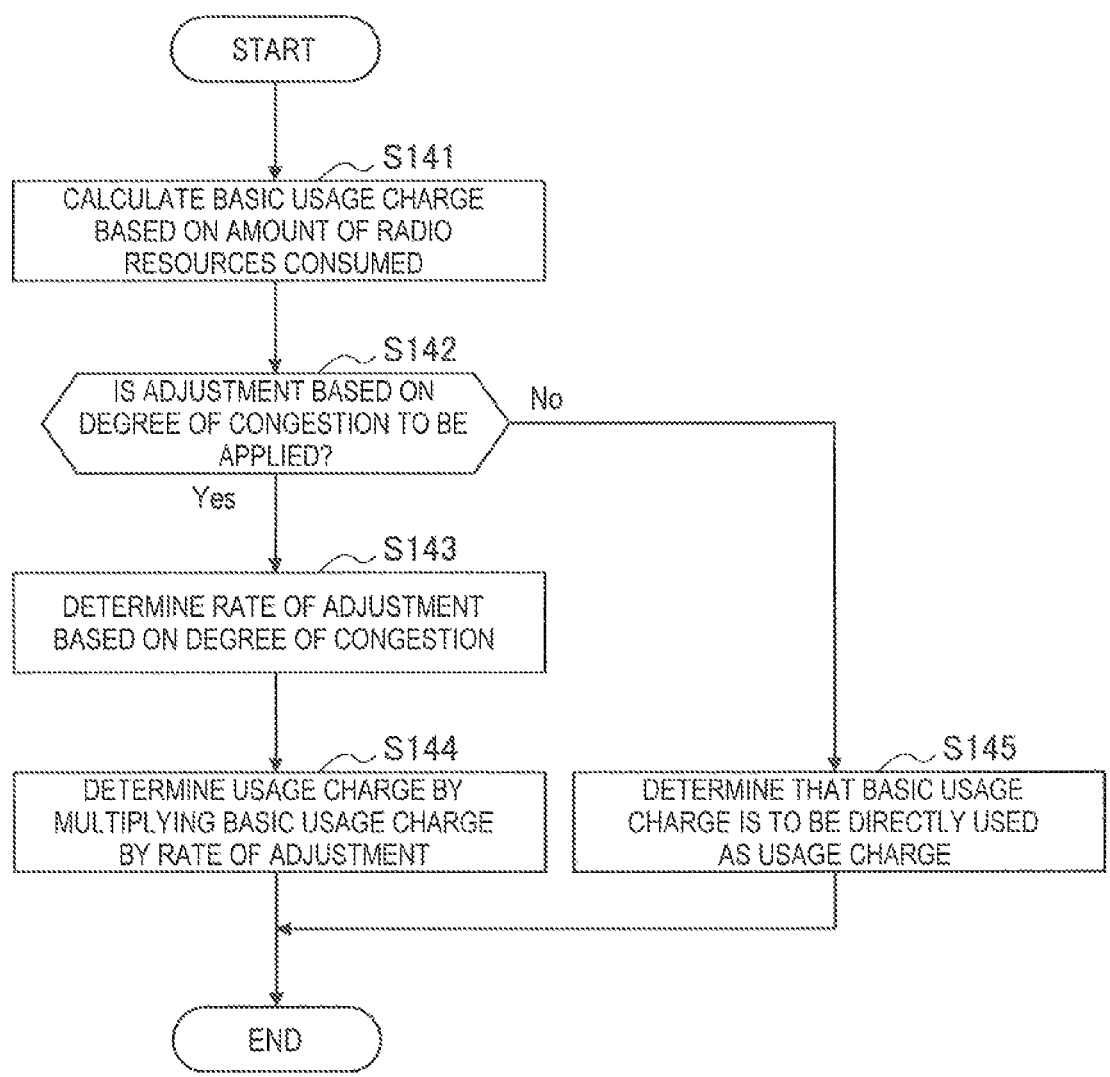
FIG. 5 is a flowchart showing an example flow of the usage charge calculation process of FIG. 4.

FIG. 5 is a flowchart showing an example flow of the usage charge calculation process of FIG. 4.

Referring to FIG. 5, initially, the calculation unit 134 calculates the basic usage charge based on the amount of radio resources consumed of an MVNO reported from the radio resource manager 44 (step S141).

Next, the calculation unit 134 determines whether or not the adjustment based on the degree of congestion is to be applied to the MVNO (e.g., in accordance with the agreement between the MNO and the MVNO) (step S142). Here, if it is determined that the adjustment based on the degree of congestion is to be applied, the process proceeds to step S143. On the other hand, if it is determined that the adjustment based on the degree of congestion is not to be applied, the process proceeds to step S145.

In step S143, the calculation unit 134 determines the rate of the adjustment based on the degree of traffic congestion which has been measured by the base station which operates for the MNO during the same period of time when the amount of radio resources consumed has been measured (step S143). The rate of the adjustment may, for example, be determined from the degree of traffic congestion using some calculation expression or correspondence table etc. Typically, when the amount of radio resources consumed is reduced to a lower level during a period of time when the degree of traffic congestion is high, the rate of the adjustment may be determined so that the usage charge is reduced. Thereafter, the calculation unit 134 multiplies the basic usage charge calculated in step S141 by the rate of the adjustment to determine a usage charge to be imposed on the MVNO (step S144).

In step S145, the calculation unit 134 determines that the basic usage charge calculated in step S141 is to be directly used as a usage charge to be imposed on the MVNO (step S145).

According to the above first example, when the same amount of data traffic is communicated, an MVNO can reduce the amount of radio resources consumed to a lower level, thereby reducing a usage charge which should be paid to an MNO. On the other hand, an end user usage charge which an MVNO receives from an end user which is a subscriber of the MVNO is, in principle, determined based on the amount of data traffic (in a flat-rate service, the end user usage charge is fixed regardless of the amount of data traffic). Therefore, an MVNO can post a reduction in a usage charge imposed by an MNO as its own profit. In other words, an MVNO can be motivated to efficiently use radio resources in order to increase profits. Also, an MVNO can determine an end user usage charge imposed on an end user, taking into account a portion of the reduction in the usage charge, thereby providing its own services at more competitive rates.

Also, the usage charge is calculated, additionally taking into account the rate of the adjustment based on the degree of traffic congestion. Therefore, for example, an MVNO can be motivated to reduce the amount of radio resources consumed during a period of time when a network is more congested. Note that, in the first example, instead of the amount of radio resources consumed, the ratio of the achieved resource efficiency to the reference resource efficiency may be used. The rate of the adjustment based on the degree of traffic congestion may not be taken into account in the calculation.

[2-3. Second Example of Usage Charge Calculation Method]

In a second example of the usage charge calculation method, as with the existing arrangement, the calculation unit 134 calculates the basic usage charge based on the result of the measurement of the amount of traffic obtained from the gateway device. The calculation unit 134 also calculates the rate of discount based on the ratio of the achieved resource efficiency to the reference resource efficiency. Thereafter, the calculation unit 134 calculates a usage charge to be imposed on an MVNO using the calculated basic usage charge and rate of discount.

(1) General Process Sequence

Figure 6:
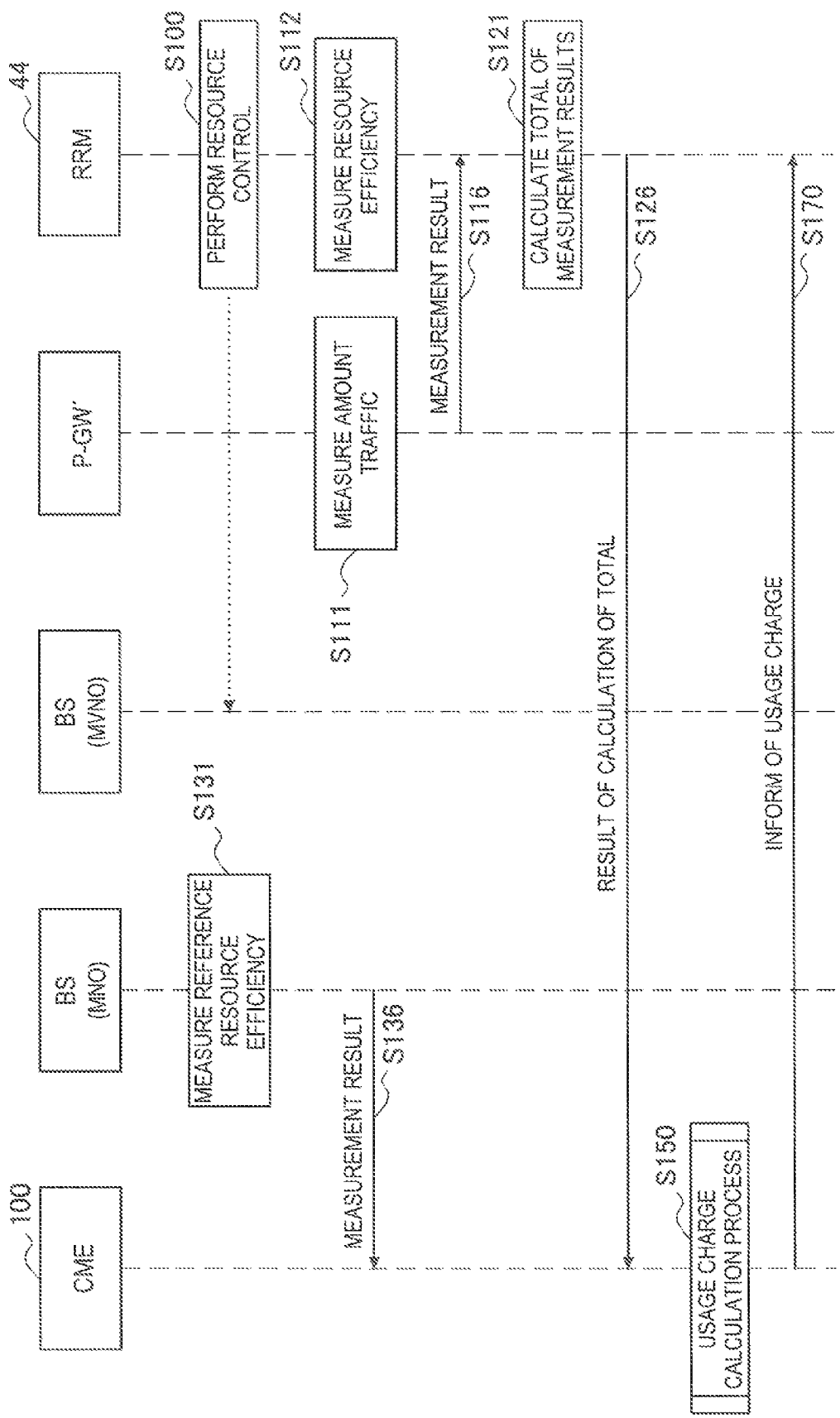
FIG. 6 is a sequence diagram showing an example general flow of a charging control process for a second example of a usage charge calculation method.

FIG. 6 is a sequence diagram showing an example general flow of a charging control process for the second example of the usage charge calculation method.

Referring to FIG. 6, initially, the radio resource manager 44 performs a resource control on a radio communications service provided by an MVNO (step S100).

Next, a gateway device located between the networks of the MNO and the MVNO measures the amount of traffic in which end users which are subscribers of the MVNO have been involved (step S111). Here, the measured amount of traffic is reported to the radio resource manager 44 (step S116).

Also, the radio resource manager 44 measures a resource efficiency achieved in the radio communications service of the MVNO using a measuring technique which is defined in both of the MNO and the MVNO (step S112).

The radio resource manager 44 calculates the total of the amounts of traffic reported from the gateway device when necessary (step S121), and reports the result of the calculation of the total of the amounts of traffic and the result of the measurement of the resource efficiency to the charging management entity 100 (step S126).

On the other hand, a base station which operates for the MNO measures the reference resource efficiency (step S131). Here, the measured reference resource efficiency is reported to the charging management entity 100 (step S136). Note that the reference resource efficiency may be previously defined instead of being measured during operation of the service, or may be determined by a simulation, an operation test, etc.

Next, the calculation unit 134 of the charging management entity 100 performs a usage charge calculation process based on the reported values of the resource-related parameters, i.e., the amount of traffic, the achieved resource efficiency, and the reference resource efficiency (step S150). Thereafter, the calculation unit 134 informs the MVNO network 40 of the calculated usage charge (step S170).

(2) Usage Charge Calculation Process

Figure 7:
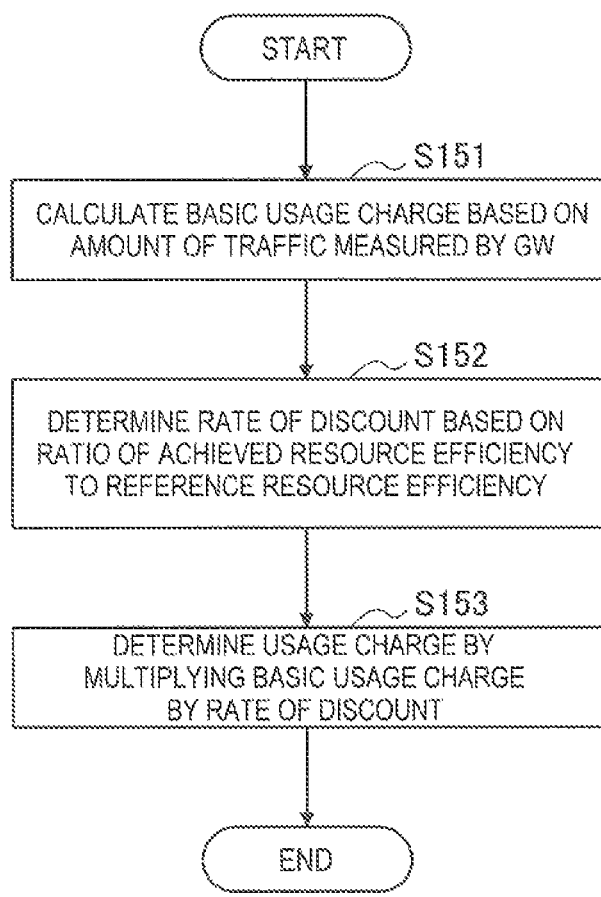
FIG. 7 is a flowchart showing an example flow of the usage charge calculation process of FIG. 6.

FIG. 7 is a flowchart showing an example flow of the usage charge calculation process of FIG. 6.

Referring to FIG. 7, initially, the calculation unit 134 calculates the basic usage charge based on the amount of traffic in which end users which are subscribers of the MVNO have been involved and which has been measured by the gateway device (step S151).

Next, the calculation unit 134 determines the rate of discount based on the ratio of the resource efficiency achieved by the MVNO to the reference resource efficiency (step S152). The rate of discount may, for example, be determined to be equal to "1" (i.e., no discount) when the achieved resource efficiency is smaller than the reference resource efficiency, and to be smaller than "1" when the achieved resource efficiency is greater than the reference resource efficiency.

Thereafter, the calculation unit 134 multiples the basic usage charge calculated in step S151 by the rate of discount determined in step S152 to determine a usage charge to be imposed on the MVNO (step S153).

Also in the above second example, an MVNO can achieve a high resource efficiency by efficiently using radio resources, thereby reducing a usage charge which should be paid to an MNO. Therefore, an MVNO can be motivated to efficiently use radio resources in order to increase profits. Also, an MVNO can determine an end user usage charge imposed on an end user, taking into account a portion of the reduction in the usage charge, thereby providing its own services at more competitive rates.

[2-4. Third Example of Usage Charge Calculation Method]

A third example of the usage charge calculation method is a combination of the above first and second examples.

(1) General Process Sequence

Figure 8:
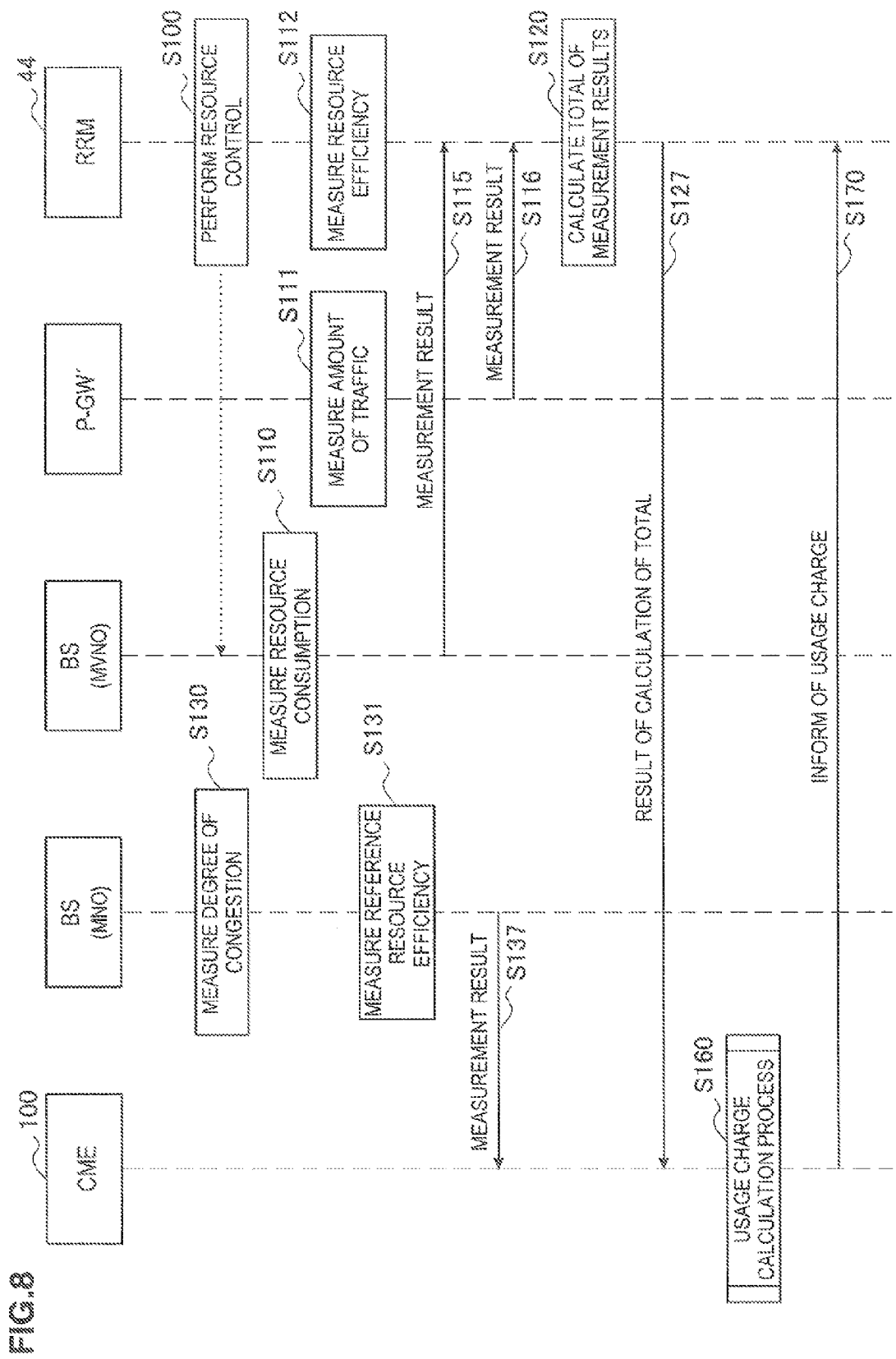
FIG. 8 is a sequence diagram showing an example general flow of a charging control process for a third example of a usage charge calculation method.

FIG. 8 is a sequence diagram showing an example general flow of a charging control process for the third example of the usage charge calculation method.

Referring to FIG. 8, initially, the radio resource manager 44 performs a resource control on a radio communications service provided by an MVNO (step S100).

Next, a base station which operates for the MVNO measures the amount of radio resources consumed in the radio communications service of the MVNO (step S110). Here, the measured amount of radio resources consumed is reported to the radio resource manager 44 (step S115).

Also, a gateway device located between the networks of the MNO and the MVNO measures the amount of traffic in which end users which are subscribers of the MVNO have been involved (step S111). Here, the measured amount of traffic is reported to the radio resource manager 44 (step S116).

Also, the radio resource manager 44 measures a resource efficiency achieved in the radio communications service of the MVNO using a measuring technique which is defined in both of the MNO and the MVNO (step S112).

The radio resource manager 44 calculates the total of the reported amounts of traffic and the total of the reported amounts of radio resources consumed when necessary, and reports the result of the calculation of the total and the result of the measurement of the resource efficiency, to the charging management entity 100 (step S127).

On the other hand, a base station which operates for the MNO measures the degree of traffic congestion (step S130). The base station also measures the reference resource efficiency (step S131). Here, the measured degree of traffic congestion and the measured reference resource efficiency are reported to the charging management entity 100 (step S137).

Next, the calculation unit 134 of the charging management entity 100 performs a usage charge calculation process based on the reported values of resource-related parameters (step S160). Thereafter, the calculation unit 134 informs the MVNO network 40 of the calculated usage charge (step S170).

(2) Usage Charge Calculation Process

Figure 9:
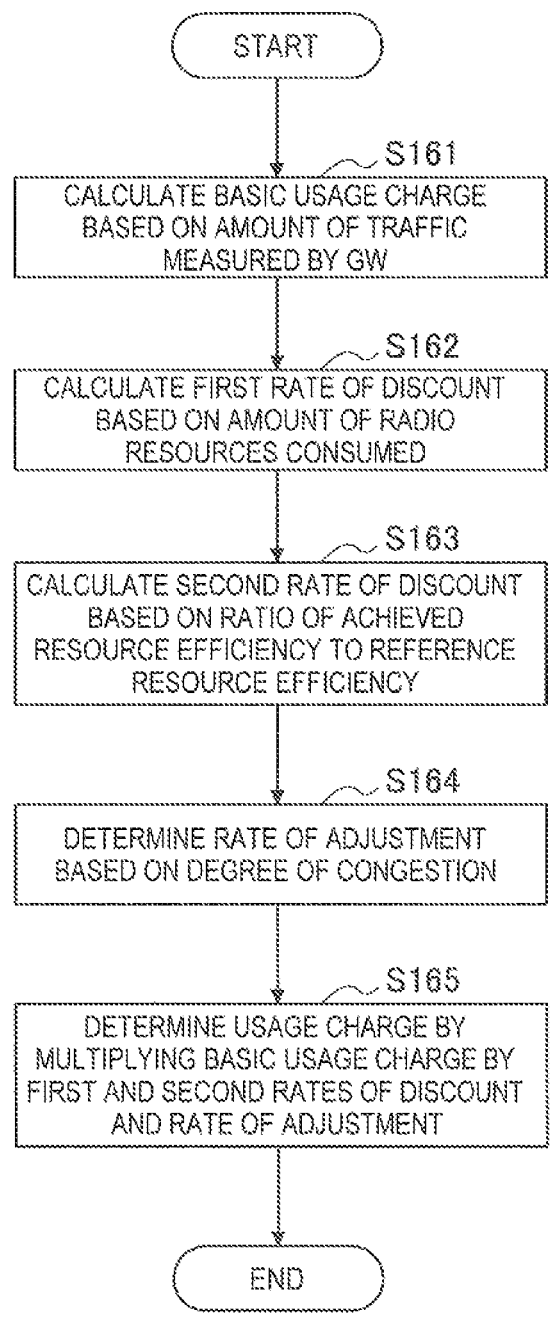
FIG. 9 is a flowchart showing an example flow of the usage charge calculation process of FIG. 8.

FIG. 9 is a flowchart showing an example flow of the usage charge calculation process of FIG. 8.

Referring to FIG. 9, initially, the calculation unit 134 calculates the basic usage charge based on the amount of traffic in which end users which are subscribers of the MVNO have been involved and which has been measured by the gateway device (step S161).

Next, the calculation unit 134 determines a first rate of discount based on the amount of radio resources consumed by the MVNO which has been reported from the radio resource manager 44 (step S162).

Next, the calculation unit 134 determines a second rate of discount based on the ratio of the resource efficiency achieved by the MVNO to the reference resource efficiency (step S163).

Next, the calculation unit 134 determines the rate of the adjustment based on the degree of traffic congestion which has been measured by the base station which operates for the MNO (step S164).

Thereafter, the calculation unit 134 multiplies the basic usage charge by the first and second rates of discount and the rate of the adjustment to determine a usage charge to be imposed on the MVNO (step S165).

Also in the above third example, an MVNO can reduce the amount of radio resources consumed to a lower level, thereby reducing a usage charge which should be paid to an MNO. Therefore, an MVNO can be motivated to efficiently use radio resources in order to increase profits or provide its own services at more competitive rates.

<3. Example Applications>

Figure 10:
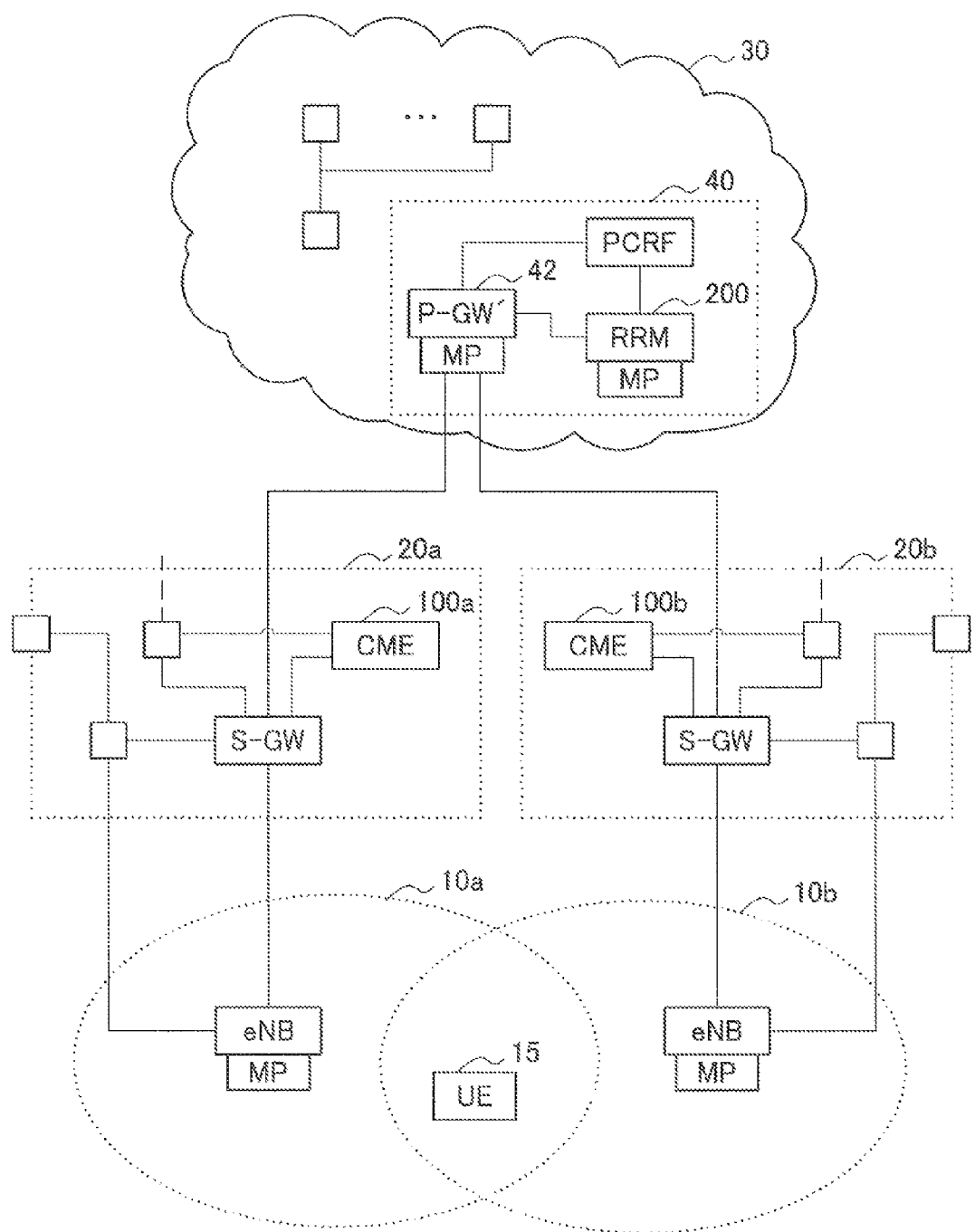
FIG. 10 is a diagram for describing a situation in which a plurality of MNOs are available to an MVNO.

The above embodiment for calculating a usage charge to be imposed on an MVNO may be applied to selection of an MNO by the MVNO. FIG. 10 is a diagram for describing a situation in which a plurality of MNOs are available to an MVNO.

Referring to FIG. 10, a gateway device 42 of an MVNO network 40 is connected to a core network 20a possessed by a first MNO and a core network 20b possessed by a second MNO. The first MNO provides a radio communications service to a user terminal located in a macro cell 10a. The second MNO provides a radio communications service to a user terminal located in a macro cell 10b. Here, it is assumed that a user terminal 15 of a user who is a subscriber of an MVNO which borrows physical networks from both of the first and second MNOs, is located in an area where the macro cells 10a and 10b overlap. The MVNO can use both of the first and second MNOs in order to provide a radio communications service to the user terminal 15. In such a situation, for example, a radio resource manager 200 in the MVNO network 40 calculates a usage charge which is predicted to be imposed by each MNO, in order to select an MNO.

[3-1. Example Configuration of Radio Resource Manager (RRM)]

Figure 11:
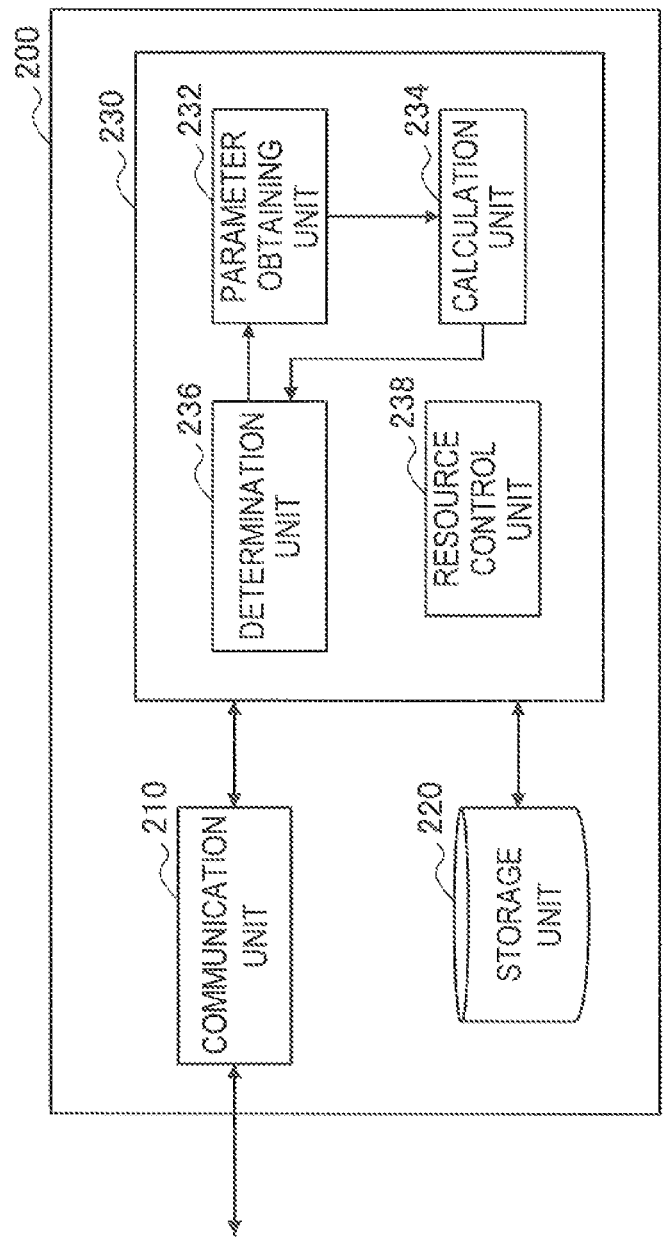
FIG. 11 is a block diagram showing an example configuration of a radio resource manager according to an embodiment.

FIG. 11 is a block diagram showing an example configuration of the radio resource manager 200. Referring to FIG. 11, the radio resource manager 200 includes a communication unit 210, a storage unit 220, and a control unit 230.

(1) Communication Unit

The communication unit 210 is a communication module for allowing the charging management entity 200 to communicate with another node. The communication unit 210 may include a radio communication module including an antenna and an RF (Radio Frequency) circuit, or a wired communication module, such as a LAN (Local Area Network)-connected terminal etc.

(2) Storage Unit

The storage unit 220 stores a program and data for operating the charging management entity 200, using a storage medium, such as a hard disk, a semiconductor memory, etc. For example, the storage unit 220 stores values of a resource-related parameter received from various measurement points, or the estimated values of the resource-related parameter. The storage unit 220 also stores a usage charge for each MVO which is predicted based on the resource-related parameter.

(3) Control Unit

The control unit 230 corresponds to a processor, such as a CPU, a DSP, etc. The control unit 230 executes a program stored in the storage unit 220 or another storage medium to cause the charging management entity 200 to perform various functions. In this embodiment, the control unit 230 includes four functional modules, i.e., a parameter obtaining unit 232, a calculation unit 234, a determination unit 236, and a resource control unit 238.

(3-1) Parameter Obtaining Unit

The parameter obtaining unit 232 obtains values of a parameter which is similar to the above resource-related parameters collected by the charging management entity 100 and is related to each of a plurality of MNOs. The resource-related parameter may, for example, include one or more of the amount of radio resources consumed, a resource efficiency achieved in a radio communications service of an MVNO, a reference resource efficiency, and the degree of traffic congestion. The amount of radio resources consumed and the achieved resource efficiency may have an estimated value or a value actually measured during a most recent period of time.

(3-2) Calculation Unit

The calculation unit 234 calculates a usage charge which is predicted to be imposed on an MVNO by each of a plurality of MNOs based on the values of the resource-related parameter obtained by the parameter obtaining unit 232. The calculation unit 234 may calculate the usage charge based on any combination of some or all of various resource-related parameters described above. The usage charge may be typically calculated to be a smaller amount of money as the efficiency of use of radio resources determined based on the resource-related parameter. Thereafter, the calculation unit 234 outputs the calculated predicted usage charge for each MNO to the determination unit 236.

(3-3) Determination Unit

The determination unit 236 determines which of the physical networks of a plurality of MNOs is to be used, based on usage charges which are predicted to be imposed by the MNOs.

The determination unit 236 may, for example, compare the predicted usage charges calculated by the calculation unit 234 for a plurality of MNOs, and determine to use the physical network of an MNO corresponding to a lowest predicted usage charge. Alternatively, the determination unit 236 may receive priority information from a user terminal, and if the priority information indicates that the end user usage charge has priority over other references for selection of an MNO, select an MNO based on comparison of end user usage charges corresponding to the above predicted usage charges. Alternatively, the determination unit 236 may present a list of predicted end user usage charges and other conditions to a user terminal, and cause the user to select one of the MNOs. Three examples of the MNO selection process which may be performed by the determination unit 236 will be further described below.

(3-4) Resource Control Unit

The resource control unit 238 controls a base station which is used by an MVNO and a user terminal of a user which is a subscriber of the MVNO so that radio resources are efficiently used. For example, the resource control unit 238 may control the transmission powers of the base station and the user terminal. Instead of or in addition to this, the resource control unit 238 may control the transmission beams of the base station and the user terminal. Note that the resource control technique is not limited to these examples.

[3-2. MNO Selection Process]

(1) First Example

Figure 12:
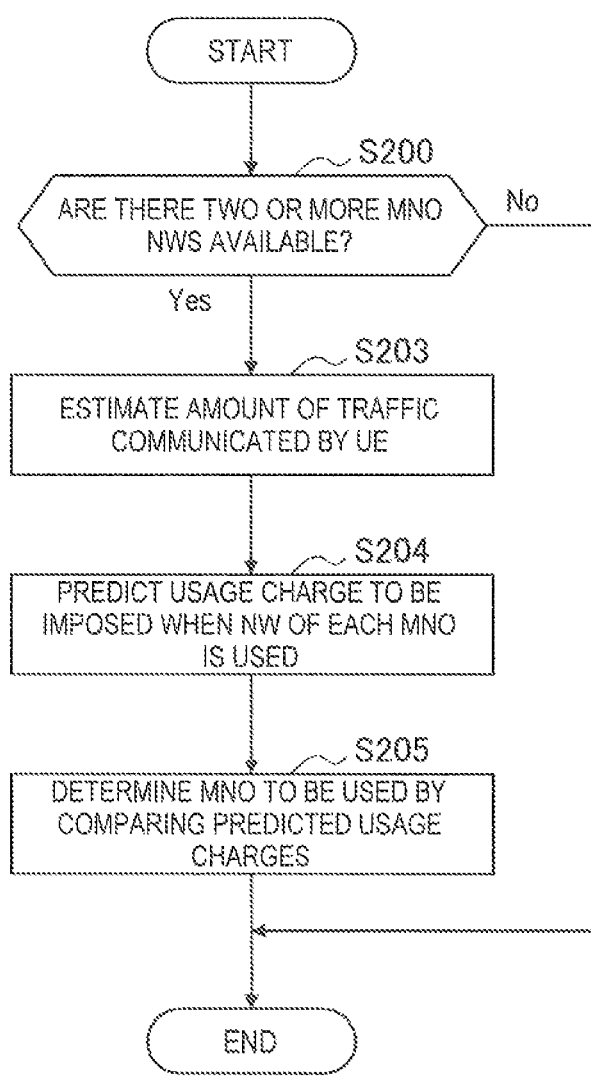
FIG. 12 is a flowchart showing a first example flow of an MNO selection process.

FIG. 12 is a flowchart showing a first example flow of the MNO selection process which may be performed by the radio resource manager 200.

Referring to FIG. 12, initially, the determination unit 236 determines whether or not there are two or more MNO physical networks available to provide a radio communications service to a user terminal (step S200). Here, if there is only one available MNO physical network, the only MNO physical network is selected, and therefore, the subsequent process is skipped. On the other hand, if there are two or more available MNO physical networks, the process proceeds to step S203.

In step S203, the determination unit 236 estimates the amount of traffic communicated by the user terminal (step S203). Here, the amount of traffic may be estimated based on, for example, a past communication history of the user terminal, a most recent result of a similar user terminal, or other conditions.

Next, the determination unit 236 causes the calculation unit 234 to calculate a usage charge which is predicted to be imposed when each of the available MNO physical networks is used (step S204). The calculation unit 234 calculates the predicted usage charge for each MNO based on the value of a resource-related parameter obtained by the parameter obtaining unit 232.

Thereafter, the determination unit 236 compares the predicted usage charges calculated by the calculation unit 234 to determine an MNO to be used (e.g., an MNO corresponding to a lowest predicted usage charge) (step S205).

Figure 13:
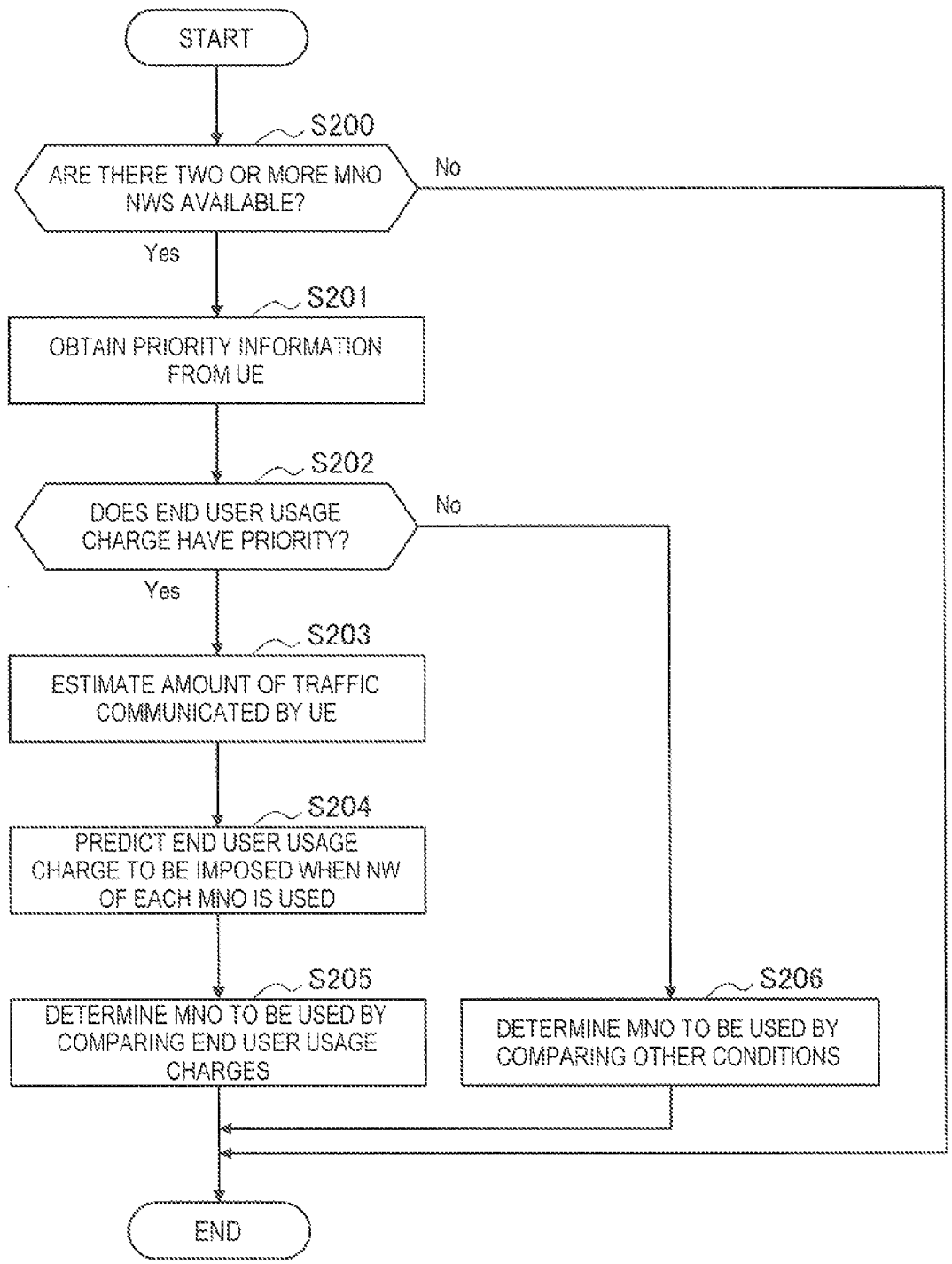
FIG. 13 is a flowchart showing a second example flow of an MNO selection process.

According to the above first example, an MVNO can automatically select an MNO which has an optimum usage charge for the MVNO to provide a radio communications service to a user terminal (2) Second Example FIG. 13 is a flowchart showing a second example flow of the MNO selection process which may be performed by the radio resource manager 200.

Referring to FIG. 13, initially, the determination unit 236 determines whether or not there are two or more MNO physical networks available to provide a radio communications service to a user terminal (step S200). Here, if there is only one available MNO physical network, the subsequent process is skipped. On the other hand, if there are two or more available MNO physical networks, the process proceeds to step S201.

In step S201, the determination unit 236 obtains priority information from a user terminal (step S201). Thereafter, the determination unit 236 determines whether or not the priority information indicates that the end user usage charge has priority in selection of an MNO (step S202). Here, if the priority information indicates that the end user usage charge has priority, the process proceeds to step S203. On the other hand, if the priority information indicates that a condition (e.g., a data rate etc.) other than the end user usage charge has priority, the process proceeds to step S206.

In step S203, the determination unit 236 estimates the amount of traffic communicated by the user terminal (step S203). Next, the determination unit 236 causes the calculation unit 234 to calculate an end user usage charge which is predicted to be imposed on the user when each of the available MNO physical networks is used (step S204). Thereafter, the determination unit 236 compares the predicted end user usage charges calculated by the calculation unit 234 to determine an MNO to be used (e.g., an MNO corresponding to a lowest predicted end user usage charge) (step S205).

Also, in step S206, the determination unit 236 compares conditions specified in the priority information to determine an MNO to be used (e.g., an MNO which can provide a highest data rate) (step S206).

The above second example is useful when a portion of the reduction in a usage charge imposed on an MVNO is taken into account when determining the end user usage charge. According to the second example, an MVNO, when a user desires a lower end user usage charge, can automatically select an optimum MNO for the user to provide a radio communications service to a user terminal.

(3) Third Example

FIG. 14 is a flowchart showing a third example flow of the MNO selection process which may be performed by the radio resource manager 200.

Referring to FIG. 14, initially, the determination unit 236 determines whether or not there are two or more MNO physical networks available to provide a radio communications service to a user terminal (step S200). Here, if there is only one available MNO physical network, the subsequent process is skipped. On the other hand, if there are two or more available MNO physical networks, the process proceeds to step S203.

In step S203, the determination unit 236 estimates the amount of traffic communicated by the user terminal (step S203). Next, the determination unit 236 causes the calculation unit 234 to calculate an end user usage charge which is predicted to be imposed on the user when each of the available MNO physical networks is used (step S204).

Next, the determination unit 236 transmits a list of the predicted end user usage charges and other conditions (e.g., a data rate etc.) for the MNOs to the user terminal so that the transmitted list is displayed on the screen of the user terminal (step S207). Here, on the displayed screen, the user selects the desired one from the MNOs.

Thereafter, the determination unit 236 receives a response indicating the result of the selection of an MNO from the user terminal, and determines that the MNO selected by the user is an MNO to be used (step S208).

According to the above third example, an MVNO can interactively select an MNO desirable to a user in terms of various aspects including an end user usage charge to provide a radio communications service to a user terminal.

<4. Summary>

In the foregoing, an embodiment of the technology of the present disclosure and example applications thereof have been described with reference to FIGS. 2 to 14. According to the above embodiment, a usage charge to be imposed by an MNO on an MVNO is calculated based on the value of a parameter which is dependent on the efficiency of use of radio resources in a radio communications service provided by the MVNO. Therefore, the MVNO can be motivated to efficiently use radio resources. Therefore, efficient use of radio resources by the MVNO is promoted, and the congestion of radio resources can be prevented or reduced while positively utilizing the MVNO.

Note that a series of control processes performed by the devices described herein may be implemented using any of software, hardware, and a combination of software and hardware. A program included in software is, for example, previously stored in each device or a storage medium externally provided. Thereafter, each program is, for example, read into a RAM during execution, and executed by a processor, such as a CPU etc.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the present technology may also be configured as below.

(1)

An information processing device including:

a calculation unit which calculates a usage charge to be imposed by a first provider on a second provider which provides a radio communications service using a physical network possessed by the first provider, wherein the calculation unit calculates the usage charge based on a value of a parameter depending on efficiency of use of radio resources in the radio communications service.

(2)

The information processing device according to (1), wherein the parameter is an amount of radio resources consumed in the radio communications service.

(3)

The information processing device according to (1), wherein the parameter includes a resource efficiency achieved in the radio communications service and a reference resource efficiency, and the calculation unit calculates the usage charge based on a ratio of the achieved resource efficiency to the reference resource efficiency.

(4)

The information processing device according to (3), wherein the achieved resource efficiency and the reference resource efficiency are each measured as a throughput on a predetermined amount of radio resources.

(5)

The information processing device according to any one of (1) to (4), wherein the calculation unit calculates the usage charge using a basic usage charge depending on an amount of traffic measured between a core network of the first provider and a network of the second provider, and a rate of discount determined based on the value of the parameter.

(6)

The information processing device according to any one of (1) to (5), wherein the calculation unit calculates the usage charge, additionally taking into account a rate of adjustment based on a degree of traffic congestion.

(7)

The information processing device according to any one of (1) to (6), further including:

a determination unit which, in a situation that the physical network possessed by the first provider and a physical network possessed by a third provider are available to allow the second provider to provide the radio communications service, determines which of the physical networks of the first and third providers is to be used, based on usage charges which are predicted to be imposed by the first provider and the third provider.

(8)

The information processing device according to any one of (1) to (6), further including:

a determination unit which, in a situation that the physical network possessed by the first provider and a physical network possessed by a third provider are available to allow the second provider to provide the radio communications service to a user terminal, informs the user terminal of an end user usage charge to be imposed when each of the physical networks is used, and based on a response from the user terminal, determines which of the physical networks of the first provider and the third provider is to be used.

(9)

A method for calculating a usage charge to be imposed by a first provider on a second provider which provides a radio communications service using a physical network possessed by the first provider, the method including:

calculating, by a processor of an information processing device, the usage charge based on a value of a parameter depending on efficiency of use of radio resources in the radio communications service.

(10)

A program for causing a computer which controls an information processing device to function as:

a calculation unit which calculates a usage charge to be imposed by a first provider on a second provider which provides a radio communications service using a physical network possessed by the first provider, based on a value of a parameter depending on efficiency of use of radio resources in the radio communications service.

REFERENCE SIGNS LIST

100 charging management entity (information processing device)
200 radio resource manager (information processing device)
132, 232 parameter obtaining unit
134, 234 calculation unit
236 determination unit

The invention claimed is:

1. An information processing device comprising: a calculation unit which calculates a usage charge to be imposed by a first provider on a second provider which provides a radio communications service using a physical network possessed by the first provider, wherein the calculation unit calculates the usage charge based on a value of a parameter depending on efficiency of use of radio resources in the radio communications service, wherein the parameter includes a resource efficiency achieved in the radio communications service and a reference resource efficiency, and the calculation unit calculates the usage charge based on a ratio of the achieved resource efficiency to the reference resource efficiency.

2. The information processing device according to claim 1, wherein the parameter is an amount of radio resources consumed in the radio communications service.

3. The information processing device according to claim 1, wherein
the achieved resource efficiency and the reference resource efficiency are each measured as a throughput on a predetermined amount of radio resources.

4. The information processing device according to claim 1, wherein
the calculation unit calculates the usage charge using a basic usage charge depending on an amount of traffic measured between a core network of the first provider and a network of the second provider, and a rate of discount determined based on the value of the parameter.

5. The information processing device according to claim 1, wherein
the calculation unit calculates the usage charge, additionally taking into account a rate of adjustment based on a degree of traffic congestion.

6. The information processing device according to claim 1, further comprising:
a determination unit which, in a situation that the physical network possessed by the first provider and a physical network possessed by a third provider are available to allow the second provider to provide the radio communications service, determines which of the physical networks of the first and third providers is to be used, based on usage charges which are predicted to be imposed by the first provider and the third provider.

7. The information processing device according to claim 1, further comprising:
a determination unit which, in a situation that the physical network possessed by the first provider and a physical network possessed by a third provider are available to allow the second provider to provide the radio communications service to a user terminal, informs the user terminal of an end user usage charge to be imposed when each of the physical networks is used, and based on a response from the user terminal, determines which of the physical networks of the first provider and the third provider is to be used.

8. A method for calculating a usage charge to be imposed by a first provider on a second provider which provides a radio communications service using a physical network possessed by the first provider, the method comprising: calculating, by a processor of an information processing device, the usage charge based on a value of a parameter depending on efficiency of use of radio resources in the radio communications service, wherein the parameter includes a resource efficiency achieved in the radio communications service and a reference resource efficiency, and the calculation unit calculates the usage charge based on a ratio of the achieved resource efficiency to the reference resource efficiency.

9. A non-transitory computer readable storage medium having stored thereon, a set of computer-executable instructions which when executed by an information processing device causes the information processing device to execute a process, the process comprising: calculating a usage charge to be imposed by a first provider on a second provider which provides a radio communications service using a physical network possessed by the first provider, based on a value of a parameter depending on efficiency of use of radio resources in the radio communications service, wherein the parameter includes a resource efficiency achieved in the radio communications service and a reference resource efficiency, and the calculation unit calculates the usage charge based on a ratio of the achieved resource efficiency to the reference resource efficiency.

* * * * *